US012705171B2

(12) United States Patent
Shukla et al.

(10) Patent No.: US 12,705,171 B2
(45) Date of Patent: Aug. 11, 2026

(54) PARTIALLY PROGRAMMED BLOCK READ OPERATIONS

(71) Applicant: Micron Technology, Inc., Boise, ID (US)

(72) Inventors: Pitamber Shukla, Boise, ID (US); Ryan Hrinya, Boise, ID (US); Fulvio Rori, Boise, ID (US); Scott A. Stoller, Boise, ID (US); Tyler Betz, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 57 days.

(21) Appl. No.: 18/591,368

(22) Filed: Feb. 29, 2024

(65) Prior Publication Data

US 2024/0303187 A1 Sep. 12, 2024

Related U.S. Application Data

(60) Provisional application No. 63/450,331, filed on Mar. 6, 2023.

(51) Int. Cl.
*G11C 16/34* (2006.01)
*G06F 12/02* (2006.01)

(52) U.S. Cl.
CPC ................................ *G06F 12/0246* (2013.01)

(58) Field of Classification Search
None
See application file for complete search history.

(56) References Cited

U.S. PATENT DOCUMENTS 9,911,498 B2 3/2018 Shirakawa
2016/0163393 A1 6/2016 Liang
2017/0315867 A1 11/2017 Yang
2018/0012667 A1 * 1/2018 Costa ................ G11C 16/0483
2018/0374551 A1 12/2018 Hu
2020/0310643 A1 10/2020 Li

FOREIGN PATENT DOCUMENTS

CN 115376594 A * 11/2022 ............ G11C 16/08

* cited by examiner

*Primary Examiner* — Alfredo Bermudez Lozada
(74) *Attorney, Agent, or Firm* — Brooks, Cameron & Huebsch, PLLC

(57) ABSTRACT

Apparatuses and methods for determining performing read operations on a partially programmed block are provided. One example apparatus can include a controller configured to apply a read voltage to a word line in an array of memory cells during a read operation on the word line, apply a first pass voltage to a number of programmed word lines in the array of memory cells during the read operation, and apply a second pass voltage to a number of unprogrammed word lines in the array of memory cells during the read operation.

18 Claims, 6 Drawing Sheets

PARTIALLY PROGRAMMED BLOCK READ OPERATIONS

PRIORITY INFORMATION

This Application claims the benefit of U.S. Provisional Application No. 63/450,331, filed on Mar. 6, 2023, the contents of which are incorporated herein by reference.

TECHNICAL FIELD

The present disclosure relates generally to read operations, and more particularly, to apparatuses and methods for read operations on partially programmed blocks.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, phase change random access memory (PCRAM), resistive random access memory (RRAM), and magnetic random access memory (MRAM), among others.

Memory devices can be combined together to form a solid state drive (SSD). An SSD can include non-volatile memory, e.g., NAND flash memory and/or NOR flash memory, and/or can include volatile memory, e.g., DRAM and/or SRAM, among various other types of non-volatile and volatile memory. Flash memory devices can include memory cells storing data in a charge storage structure such as a floating gate, for instance, and may be utilized as non-volatile memory for a wide range of electronic applications. Flash memory devices typically use a one-transistor memory cell that allows for high memory densities, high reliability, and low power consumption.

An SSD can be used to replace hard disk drives as the main storage volume for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives.

Memory is utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Memory cells in an array architecture can be programmed to a desired state. For instance, electric charge can be placed on or removed from the charge storage structure, e.g., floating gate, of a memory cell to program the cell to a particular state. For example, a single level (memory) cell (SLC) can be programmed to one of two different states, each representing a different digit of a data value, e.g., a 1 or 0. Some flash memory cells can be programmed to one of more than two states corresponding to different particular data values, e.g., 1111, 0111, 0011, 1011, 1001, 0001, 0101, 1101, 1100, 0100, 0000, 1000, 1010, 0010, 0110, or 1110. Such cells may be referred to as multi state memory cells, multiunit cells, or multilevel (memory) cells (MLCs). MLCs can provide higher density memories without increasing the number of memory cells since each cell can be programmed to states corresponding to more than one digit, e.g., more than one bit of data.

DETAILED DESCRIPTION

Figure 1:
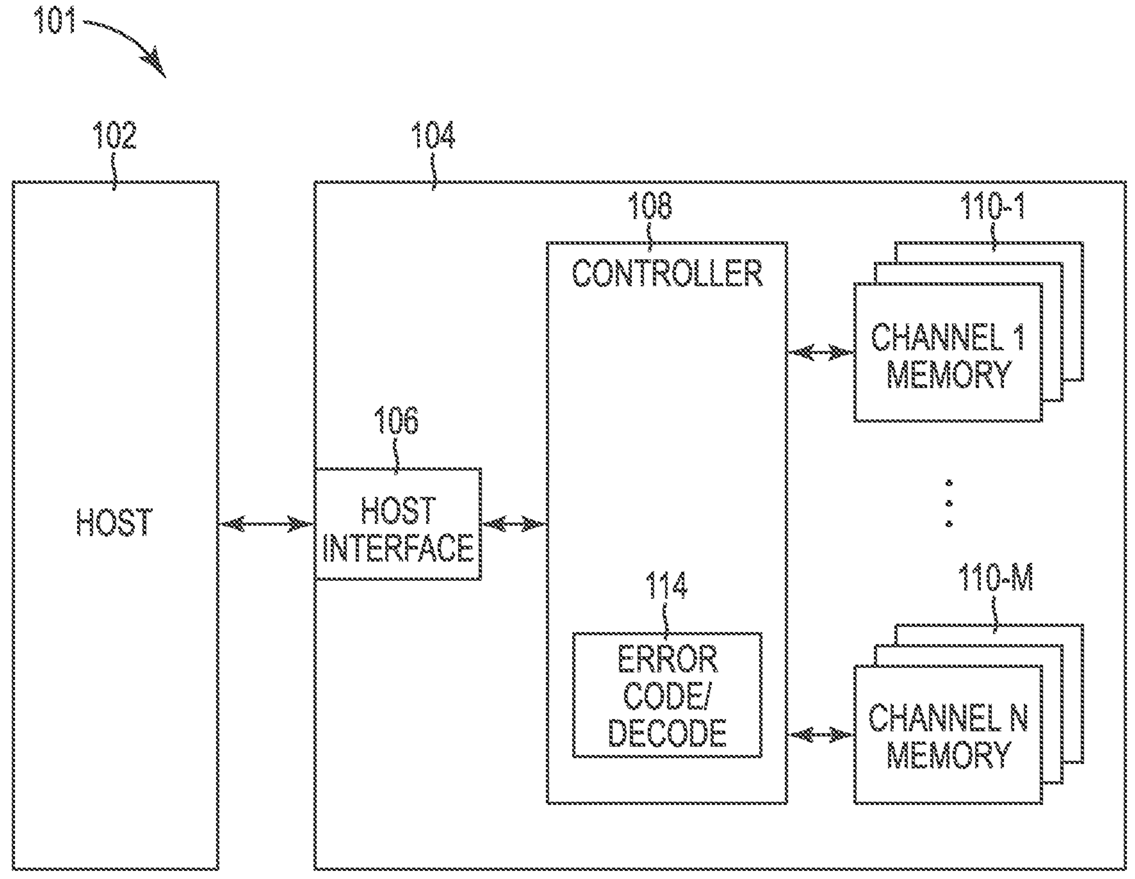
FIG. 1 is a block diagram of an apparatus in the form of a computing system including at least one memory system in accordance a number of embodiments of the present disclosure.

The present disclosure provides apparatuses and methods for performing read operations on a partially programmed block. One example apparatus can include a controller configured to apply a read voltage to a word line in an array of memory cells during a read operation on the word line, apply a first pass voltage to a number of programmed word lines in the array of memory cells during the read operation, and apply a second pass voltage to a number of unprogrammed word lines in the array of memory cells during the read operation.

When a memory device is being programmed, a read command may be received for data that is located in a partially programmed block (e.g., a block where a portion of the word lines are programmed and a portion of the word lines are unprogrammed in an erased state). During a read operation, applying Vpass to unprogrammed word lines in a partially programmed block can cause the threshold voltages in the memory cells being read to be lower than when performing a read operation in a fully programmed block by applying Vpass to each word line other than the word line being read.

In a number of embodiments, when performing a read operation on a partially programmed block, a Vpass_erase signal can be applied to the unprogrammed word lines in the partially programmed block. The magnitude of the Vpass_erase signal can be lower than the magnitude of the Vpass signal (which is applied to the programmed word lines in the partially programmed block when performing a read operation) to reduce the voltage threshold drop in the memory cells being read that can be caused by applying the Vpass signal to the unprogrammed memory cells in the partially programmed block.

In a number of embodiments, the magnitude of the Vpass_erase signal can be calculated based on a quantity or relative quantity, such as percentage, of unprogrammed word lines in the partially programmed word lines. For example, if 10% of the word lines in the partially programmed block are unprogrammed, Vpass_erase can be 10% less than Vpass. If 70% of the word lines in the partially programmed block are unprogrammed, Vpass_erase can be 70% less than Vpass.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" something can refer to one or more such things. For example, a number of memory cells can refer to one or more memory cells. Additionally, the designators "M" and "N" as used herein, particularly with respect to reference numerals in the drawings, indicates that a number of the particular feature so designated can be included with a number of embodiments of the present disclosure.

The figures herein follow a numbering convention in which the first bit or bits correspond to the drawing figure number and the remaining bits identify an element or component in the drawing. Similar elements or components between different figures may be identified by the use of similar bits. For example, 100 may reference element "00" in FIG. 1, and a similar element may be referenced as 600 in FIG. 6. Elements shown in the various embodiments herein can be added, exchanged, and/or eliminated so as to provide a number of additional embodiments of the present disclosure. In addition, the proportion and the relative scale of the elements provided in the figures are intended to illustrate the embodiments of the present disclosure, and should not be taken in a limiting sense.

FIG. 1 is a block diagram of an apparatus in the form of a computing system 101 including at least one memory system 104 in accordance with a number of embodiments of the present disclosure. As used herein, a memory system 104, a controller 108, or a memory device 110 might also be separately considered an "apparatus". The memory system 104 can be a solid state drive (SSD), for instance, and can include a host interface 106, a controller 108, e.g., a processor and/or other control circuitry, and a number of memory devices 110-1, . . . , 510-M, e.g., solid state memory devices such as NAND flash devices, which provide a storage volume for the memory system 104. In a number of embodiments, the controller 108, a memory device 110-1 to 110-M, and/or the host interface 106 can be physically located on a single die or within a single package, e.g., a managed NAND application. Also, in a number of embodiments, a memory, e.g., memory devices 110-1 to 110-M, can include a single memory device.

As illustrated in FIG. 1, the controller 108 can be coupled to the host interface 106 and to the memory devices 110-1, . . . , 110-M via a plurality of channels and can be used to transfer data between the memory system 104 and a host 102. The interface 106 can be in the form of a standardized interface. For example, when the memory system 104 is used for data storage in a computing system 100, the interface 106 can be a serial advanced technology attachment (SATA), peripheral component interconnect express (PCIe), or a universal serial bus (USB), among other connectors and interfaces. In general, however, interface 106 can provide an interface for passing control, address, data, and other signals between the memory system 104 and a host 102 having compatible receptors for the interface 106.

Host 102 can be a host system such as a personal laptop computer, a desktop computer, a digital camera, a mobile telephone, or a memory card reader, among various other types of hosts. Host 102 can include a system motherboard and/or backplane and can include a number of memory access devices, e.g., a number of processors.

The controller 108 can communicate with the memory devices 110-1, . . . , 110-M to control data read, write, and erase operations, among other operations. The controller 108 can include, for example, a number of components in the form of hardware and/or firmware, e.g., one or more integrated circuits, and/or software for controlling access to the number of memory devices 110-1, . . . , 110-M and/or for facilitating data transfer between the host 102 and memory devices 110-1, . . . , 110-M. For instance, in the example illustrated in FIG. 1, the controller 108 includes an error correcting code encoder/decoder component 114. However, the controller 108 can include various other components not illustrated so as not to obscure embodiments of the present disclosure. Also, the component 114 may not be components of controller 108, in some embodiments, e.g., component 114 can be independent components.

The error correcting code encoder/decoder component 114 can be an LDPC encoder/decoder, for instance, which can encode/decode user data transferred between host 102 and the memory devices 110-1, . . . , 110-M.

The memory devices 110-1, . . . , 110-M can include a number of arrays of memory cells. The arrays can be flash arrays with a NAND architecture, for example. However, embodiments are not limited to a particular type of memory array or array architecture. The memory cells can be grouped, for instance, into a number of blocks including a number of physical pages. A number of blocks can be included in a plane of memory cells and an array can include a number of planes. A block can include a number of word lines that can be erased together as a group. A page can include a number of memory cells that can be read together as a group, such as a number of memory cells on a word line. As one example, a memory device may be configured to store 8KB (kilobytes) of user data per page, 128 pages of user data per block, 2048 blocks per plane, and 16 planes per device.

Figure 2:
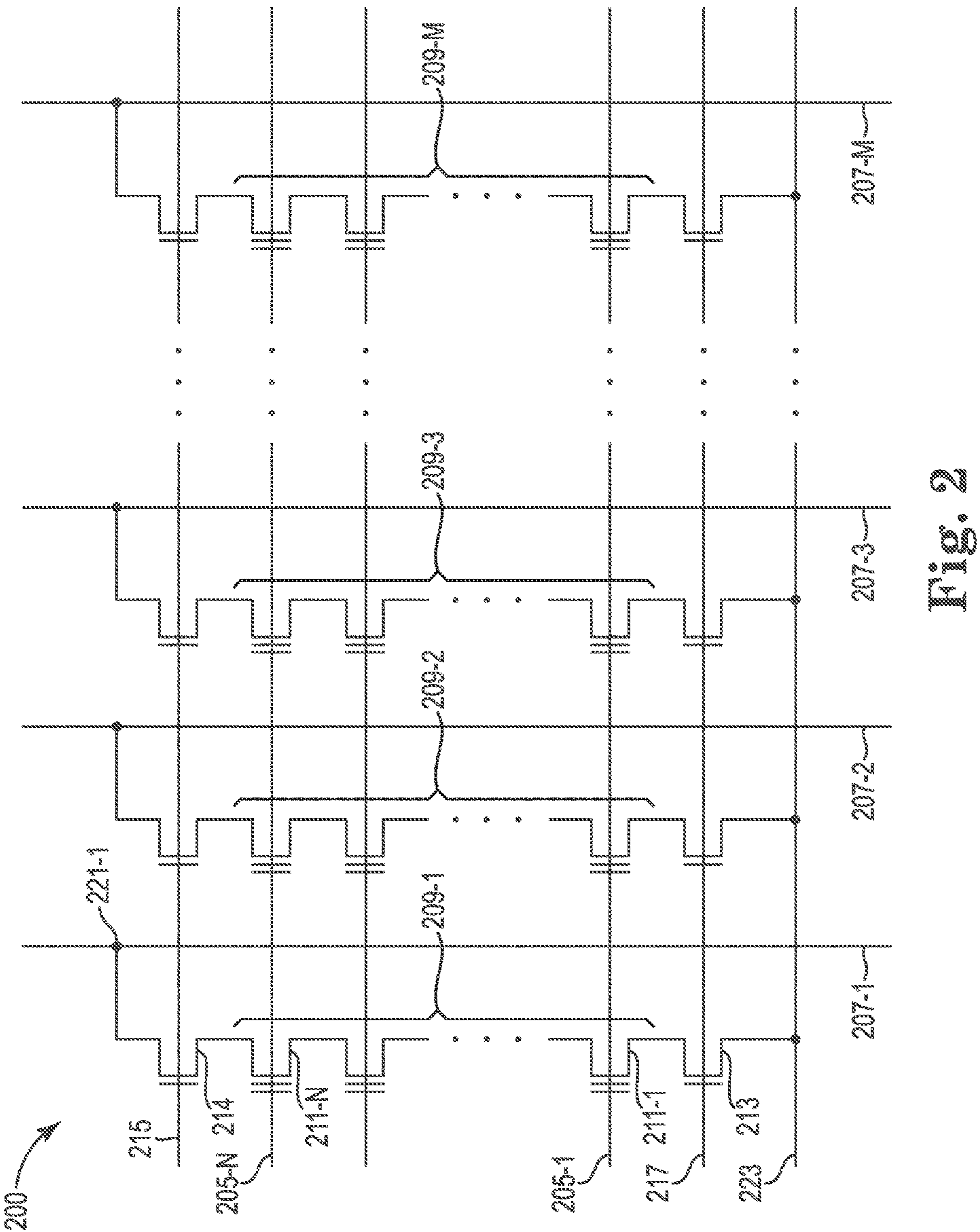
FIG. 2 illustrates a schematic diagram of a portion of a non-volatile memory array in accordance with a number of embodiments of the present disclosure.

FIG. 2 illustrates a schematic diagram of a portion of a non-volatile memory array 200 in accordance with a number of embodiments of the present disclosure. The embodiment of FIG. 2 illustrates a NAND architecture non-volatile memory array, e.g., NAND Flash. However, embodiments described herein are not limited to this example. As shown in FIG. 2, memory array 200 includes access lines, e.g., word lines 205-1, . . . , 205-N, and intersecting data lines, e.g., local bit lines, 207-1, 207-2, 207-3, . . . , 207-M. For ease of addressing in the digital environment, the number of word lines 205-1, . . . , 205-N and the number of local bit lines 207-1, 207-2, 207-3, . . . , 207-M can be some power of two, e.g., 256 word lines by 4,096 bit lines.

Memory array 200 includes NAND strings 209-1, 209-2, 209-3, . . . , 209-M. Each NAND string includes non-volatile memory cells 211-1, . . . , 211-N, each communicatively coupled to a respective word line 205-1, . . . , 205-N. Each NAND string (and its constituent memory cells) is also associated with a local bit line 207-1, 207-2, 207-3, . . . , 207-M. The non-volatile memory cells 211-1, . . . , 211-N of each NAND string 209-1, 209-2, 209-3, . . . , 209-M are connected in series source to drain between a source select gate (SGS), e.g., a field-effect transistor (FET), 213, and a drain select gate (SGD), e.g., FET, 214. Each source select gate 213 is configured to selectively couple a respective NAND string to a common source 223 responsive to a signal on source select line 217, while each drain select gate 214 is configured to selectively couple a respective NAND string to a respective bit line responsive to a signal on drain select line 215.

As shown in the embodiment illustrated in FIG. 2, a source of source select gate 213 is connected to a common source line 223. The drain of source select gate 213 is connected to the source of the memory cell 211-1 of the corresponding NAND string 209-1. The drain of drain select gate 214 is connected to bit line 207-1 of the corresponding NAND string 209-1 at drain contact 221-1. The source of drain select gate 214 is connected to the drain of the last memory cell 211-N, e.g., a floating-gate transistor, of the corresponding NAND string 409-1.

In a number of embodiments, construction of non-volatile memory cells 211-1, . . . , 211-N includes a source, a drain, a charge storage structure such as a floating gate, and a control gate. Non-volatile memory cells 211-1, . . . , 211-N have their control gates coupled to a word line, 205-1, . . . , 205-N respectively. A “column” of the non-volatile memory cells, 211-1, . . . , 211-N, make up the NAND strings 209-1, 209-2, 209-3, . . . ,209-M, and are coupled to a given local bit line 207-1, 207-2, 207-3, . . . , 207-M, respectively. A “row” of the non-volatile memory cells are those memory cells commonly coupled to a given word line 205-1, . . . , 205-N. The use of the terms “column” and “row” is not meant to imply a particular linear, e.g., vertical and/or horizontal, orientation of the non-volatile memory cells. A NOR array architecture would be similarly laid out, except that the string of memory cells would be coupled in parallel between the select gates.

Subsets of cells coupled to a selected word line, e.g., 205-1, . . . , 205-N, can be programmed and/or read together as a page of memory cells. A programming operation, e.g., a write operation, can include applying a number of program pulses, e.g., 16V-20V, to a selected word line in order to increase the threshold voltage (Vt) of selected cells coupled to that selected access line to a desired program voltage level corresponding to a target, e.g., desired, state, e.g., charge storage state. State is equivalently referred to as “level” herein.

A read operation, which can also refer to a program verify operation, can include sensing a voltage and/or current change of a bit line coupled to a selected cell in order to determine the state of the selected cell. The states of a particular fractional bit memory cell may not correspond directly to a data value of the particular memory cell, rather the states of a group of memory cells including the particular memory cell together map to a data value having an integer number of bits. The read operation can include pre-charging a bit line and detecting the discharge when a selected cell begins to conduct.

Determining, e.g., detecting, the state of a selected cell can include providing a number of sensing signals, e.g., read voltages, to a selected word line while providing a number of voltages, e.g., read pass voltages, to the word lines coupled to the unselected cells of the string sufficient to place the unselected cells in a conducting state independent of the threshold voltage of the unselected cells. The bit line corresponding to the selected cell being read and/or verified can be detected to determine whether or not the selected cell conducts in response to the particular sensing signal applied to the selected word line. For example, the state of a selected cell can be determined by the word line voltage at which the bit line current reaches a particular reference current associated with a particular state.

MLCs can be two-bit, e.g., four-state, memory cells, or store more than two bits of data per memory cell, including fractional bits of data per memory cell. For example, a two-bit memory cell can be programmed to one of four states, e.g., P0, P1, P2, and P3, respectively. In operation, a number of memory cells, such as in a selected block, can be programmed such that they have a Vt level corresponding to either P0, P1, P2, or P3. As an example, state P0 can represent a stored data value such as binary “11”. State P1 can represent a stored data value such as binary “10”. State P2 can represent a stored data value such as binary “00”. State P3 can represent a stored data value such as binary “01”. However, embodiments are not limited to these data value correspondence.

Figure 3A:
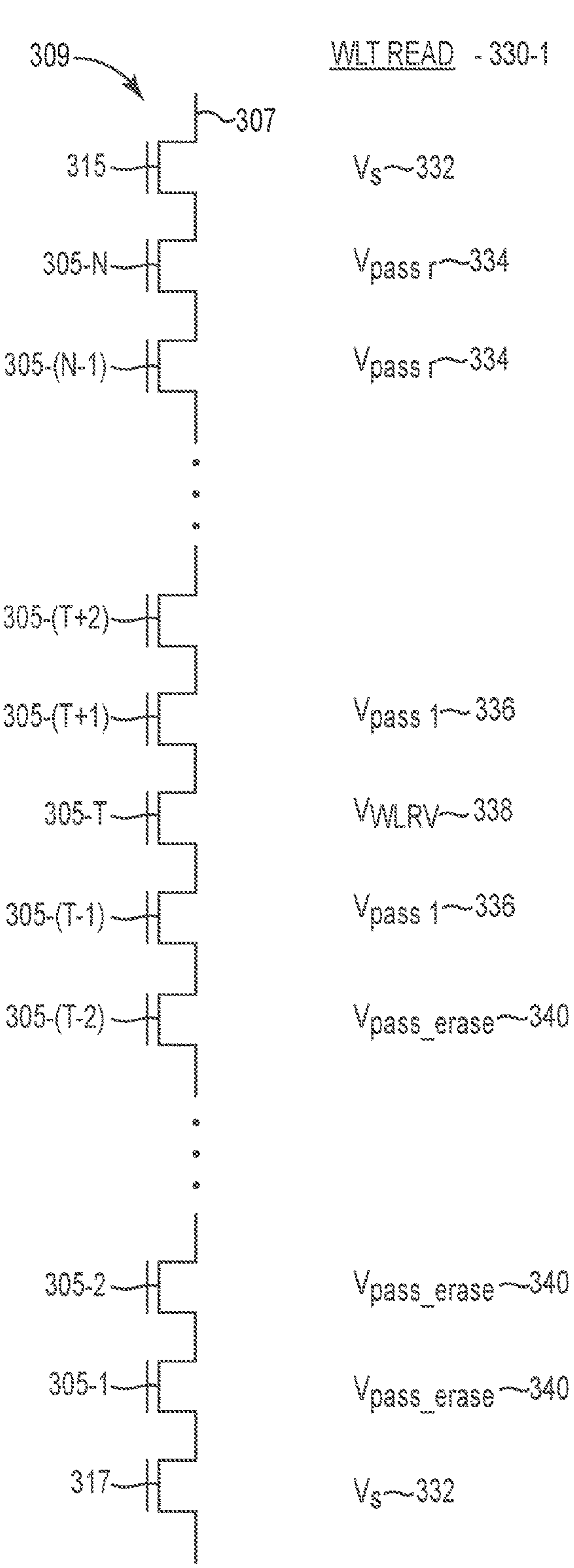
FIG. 3A illustrates a table of operating voltages associated with performing various operations on data memory cells and reference memory cells in accordance with an embodiment of the present disclosure.

FIG. 3A illustrates a table of operating voltages associated with performing various operations on data memory cells and reference memory cells in accordance with an embodiment of the present disclosure. The table illustrates operating voltages, e.g., bias conditions, associated with performing a read operation 330-1 on word line T (WLT READ) on one or more data cells coupled to a selected word line, e.g., word line 305-T (WLT) in this example. As shown in the table, the read operation 330-1 performed on the memory cell coupled to selected word line 305-T includes applying a word line read voltage (VWLRV) to the selected word line 305-T.

The read operation 330-1 includes applying a pass through voltage to unselected word lines such that unselected cells in string 309 operate in a conducting mode, e.g., the unselected cells in string 309 are turned on and pass current without regard to the Vt level of the unselected cells. In the example illustrated in the table, the string 309 is part of a partially programmed block of memory cells. The memory cells coupled to word lines 305-(T+1) to 305-N are programmed and the memory cells coupled to word lines 305-(T−1) to 305-1 are unprogrammed. The read operation 330-1 can include applying a first pass voltage 336 (Vpass1) to the unselected word lines adjacent to the selected word line, such that Vpass1 336 is applied to word lines 305-(T−1) and 305-(T+1), which are adjacent to the selected word line 305-T. The read operation 330-1 can include applying a second pass voltage 334 (Vpassr) to the unselected word lines in the block that are programmed, such that Vpassr 334 is applied to word lines 305-(T+2) to 305-N. The read operation 330-1 can include applying a third pass voltage 340 (Vpass_erase) to the unselected word lines in the block that are unprogrammed, such that Vpass_erase 340 is applied to word lines 305-(T−2) to 305-1. Applying Vpassr to unprogrammed word lines in a partially programmed block can cause the threshold voltages in the memory cells being read to be lower than when performing a read operation in a fully programmed block by applying Vpassr to each word line other than the word line being read.

In read operation 330-1, the magnitude of Vpass_erase 340 can be less that the magnitude of Vpassr 334 to reduce the voltage threshold drop in the memory cells being read that can be caused by applying the Vpassr 334 with a higher magnitude than Vpass_erase 340 to the unprogrammed memory cells in the partially programmed block. The magnitude of Vpass1 336 can be greater than both Vpassr 334 and Vpass_erase 340.

In this example, drain select line 315 and the source select line 317 are biased at a select voltage Vs 332, e.g., 5V, which is sufficient to turn on the respective drain select gate (SGD) and source select gate (SGS) transistors. Under the biasing conditions shown in the table, voltage and/or current levels on bit line 307 in response to the particular applied word line read voltage (VWLRV) can be sensed by sensing circuitry (not shown) in order to determine a particular state, e.g., state L0, L1, L2, or L3, of the selected data cell 305-T.

A read operation can be performed on any of the programmed word lines in a partially programmed block using first, second, and/or third pass voltages, according to embodiments of the present disclosure. For example, in FIG. 3A, the partially programmed block includes programmed word lines 305-N to 305-T and unprogrammed word lines 305-(T-1) to 305-1, where word line 305-T is the boundary word line (e.g., the last programmed word line) in a partially programmed block. If any one of the programmed word lines 305-N to 305-T are being read, VWLRV 338 can be applied to the word line being read, such as word line 305-(T+1), for example. Vpass 1 336 can be applied to the two word lines adjacent to the word line being read, such as word line 305-T and word line 305-(T+2), for example. Vpass r 334 can be applied to the remaining programmed word lines, such as word line 305-(T+3) (not shown) to word line 305-N, for example. Vpass_erase 340 can be applied to the unprogrammed word lines, word lines 305-(T−1) to 305-1, for example.

Figure 3B:
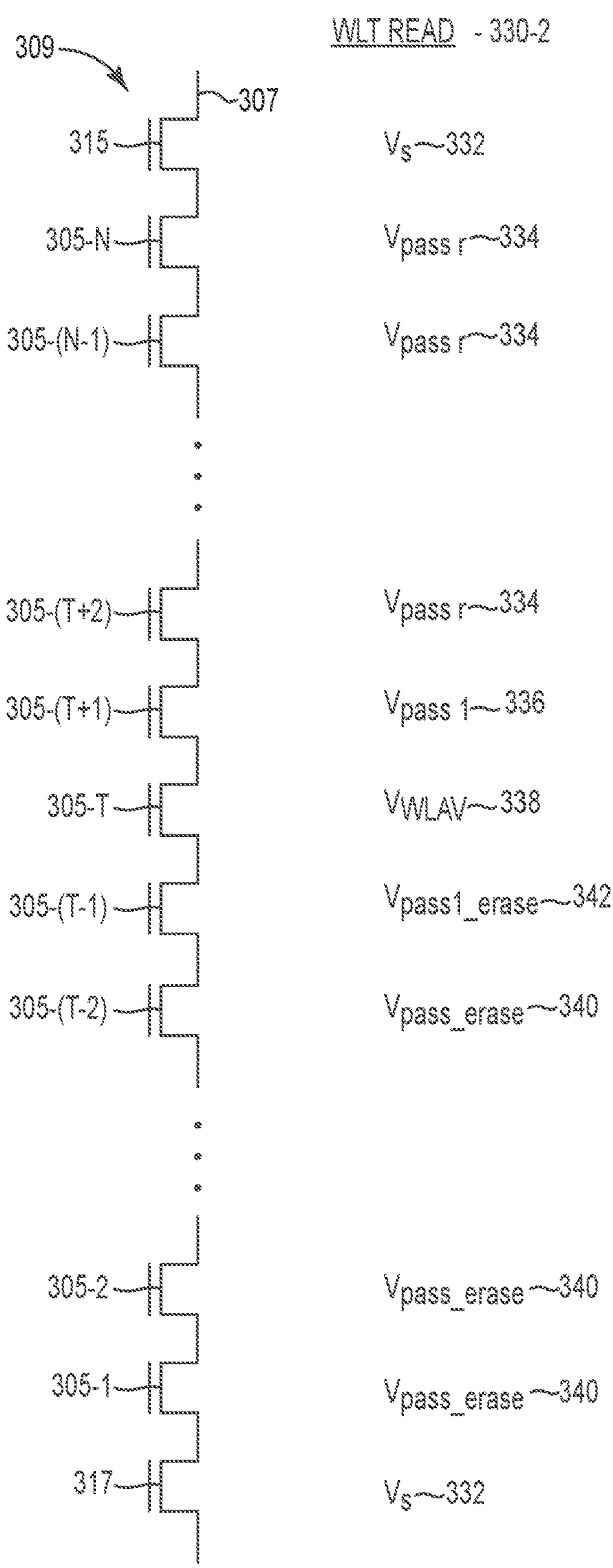
FIG. 3B illustrates a table of operating voltages associated with performing a read operation on data memory cells and reference memory cells in accordance with an embodiment of the present disclosure.

FIG. 3B illustrates a table of operating voltages associated with performing a read operation on data memory cells and reference memory cells in accordance with an embodiment of the present disclosure. The table illustrates operating voltages, e.g., bias conditions, associated with performing a read operation 330-2 (WLT READ) on one or more data cells coupled to a selected word line, e.g., word line 305-T (WLT) in this example. As shown in the table, the read operation 330-2 performed on the memory cell coupled to selected word line 305-T includes applying a word line read voltage 338 (VWLRV) to the selected word line 305-T. A read operation can be performed on any of the programmed word lines in a partially programmed block using first, second, third, and/or fourth pass voltages, according to embodiments of the present disclosure. For example, word line 305-T is being read.

The read operation 330-2 includes applying a pass through voltage to unselected word lines such that unselected cells in string 309 operate in a conducting mode, e.g., the unselected cells in string 309 are turned on and pass current without regard to the Vt level of the unselected cells. In the example illustrated in the table, the string 309 is part of a partially programmed block of memory cells. The memory cells coupled to word lines 305-(T+1) to 305-N are programmed and the memory cells coupled to word lines 305-(T−1) to 305-1 are unprogrammed. The read operation 330-2 can include applying a first pass voltage 336 (Vpass1) to the programmed unselected word lines adjacent to the selected word line, such that Vpass1 336 is applied to word line 305-(T+1), which is adjacent to the selected word line 305-T. The read operation 330-2 can include applying a second pass voltage 342 (Vpass1_erase) to the unprogrammed unselected word lines adjacent to the selected word line, such that Vpass1_erase 342 is applied to word line 305-(T−1), which is adjacent to the selected word line 305-T. The read operation 330-2 can include applying a third pass voltage 334 (Vpassr) to the unselected word lines in the block that are programmed, such that Vpassr 334 is applied to word lines 305-(T+2) to 305-N. The read operation 330-2 can include applying a fourth pass voltage 342 (Vpass1_erase) to the unselected word lines in the block that are unprogrammed, such that Vpass_erase 340 is applied to word lines 305-(T−2) to 305-1. Applying Vpassr to unprogrammed word lines in a partially programmed block can cause the threshold voltages in the memory cells being read to be lower than when performing a read operation in a fully programmed block by applying Vpassr to each word line other than the word line being read.

In read operation 330-2, the magnitude of Vpass_erase 340 can be less that the magnitude of Vpassr 334 to reduce the voltage threshold drop in the memory cells being read that can be caused by applying the Vpassr 334 with a higher magnitude than Vpass_erase 340 to the unprogrammed memory cells in the partially programmed block. The magnitude of Vpass1 336 and Vpass1_erase 342 can be greater than both Vpassr 334 and Vpass_erase 340. The magnitude of Vpass1 336 can be greater than the magnitude of Vpass1_erase 342.

In this example, drain select line 315 and the source select line 317 are biased at a select voltage Vs 332, e.g., 5V, which is sufficient to turn on the respective drain select gate (SGD) and source select gate (SGS) transistors. Under the biasing conditions shown in the table, voltage and/or current levels on bit line 307 in response to the particular applied word line read voltage (VWLRV) can be sensed by sensing circuitry (not shown) in order to determine a particular state, e.g., state L0, L1, L2, or L3, of the selected data cell 305-T.

Figure 4:
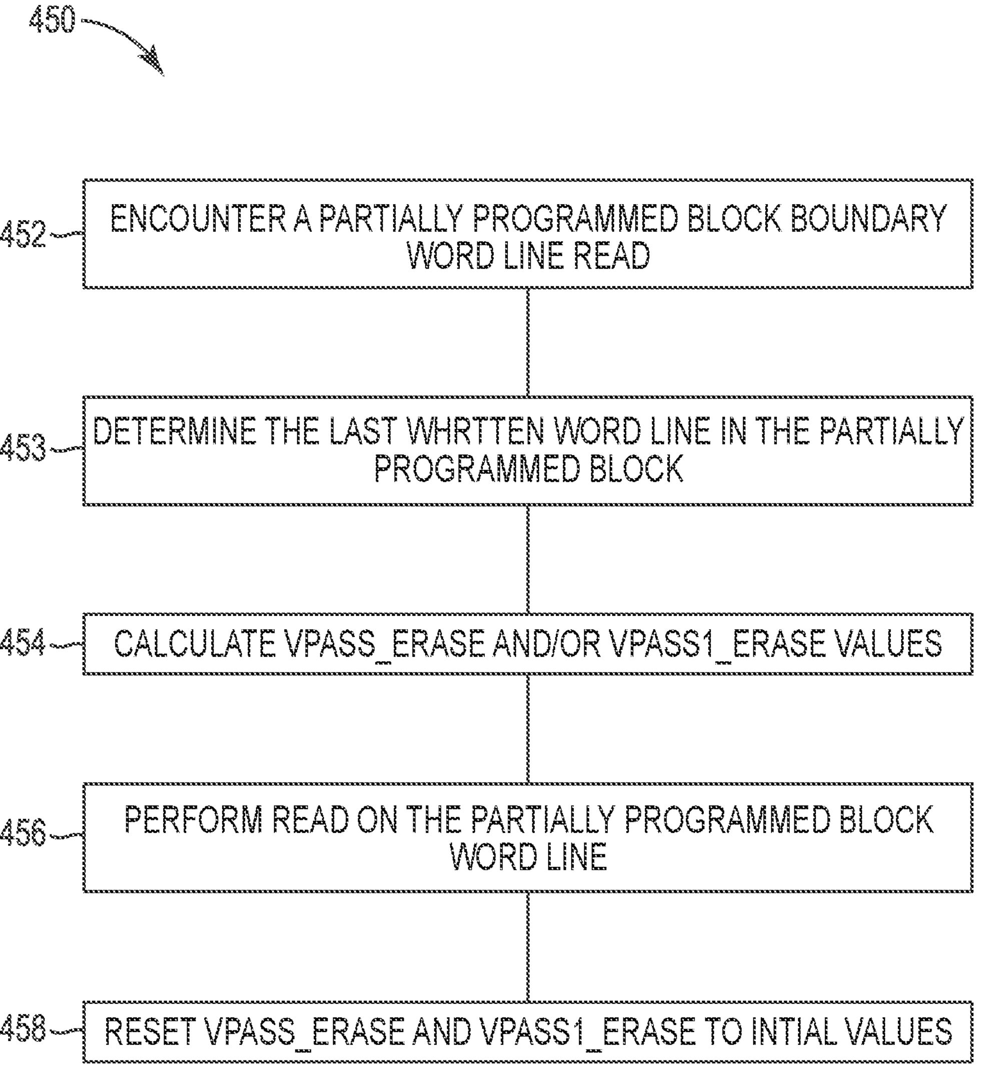
FIG. 4 is a flow diagram of a method for calculating voltages for a read operation on a partially programmed block in accordance with a number of embodiments of the present disclosure.

FIG. 4 is a flow diagram of a method 450 for calculating voltages for a read operation on a partially programmed block in accordance with a number of embodiments of the present disclosure. In FIG. 4, the method 450 can include encountering a partially programmed block boundary word line read 452. The method can include identifying that a read command is requesting data at a boundary word line (e.g., the most recently programmed word line in a partially programmed block). The method can include determining the last written word line in the partially programmed block 453, which is the boundary word line, and determining where the boundary word line is located in the partially programmed block. The method can include calculating Vpass_erase and/or Vpass1_erase voltages. Calculating Vpass_erase and/or Vpass1_erase voltages can be based on how many programmed word lines are in the partially programmed block and how many unprogrammed word lines are in the partially programmed block.

The magnitude of the Vpass_erase and Vpass1_erase signals can be calculated based on a quantity or relative quantity, such as a percentage, of unprogrammed word lines in the partially programmed block. For example, if 10% of the word lines in the partially programmed block are unprogrammed, Vpass_erase and Vpass1_erase can be 10% less than Vpass and Vpass1, respectively. If 70% of the word lines in the partially programmed block are unprogrammed, Vpass_erase and Vpass1_erase can be 70% less than Vpass and Vpass1, respectively.

Calculating Vpass_erase and/or Vpass1_erase voltages can be performed by executing an algorithm on the controller to determine the magnitude Vpass_erase and/or Vpass1_erase voltages based on the number of unprogrammed and the number of programmed word lines in the partially programmed block. Vpass_erase and/or Vpass1_erase voltages for a partially programmed block can also be stored in a look up table and the controller can determine which Vpass_erase and/or Vpass1_erase voltages to use based on the values in the look up table. The look up table can be stored in the controller and/or the array of memory cells. For example, the look up table can include a first Vpass_erase voltage and a first Vpass1_erase voltage when between 0% and 10% of the word lines in a partially programmed block are programmed, a second Vpass_erase voltage and a second Vpass1_erase voltage when between 10% and 20% of the word lines in a partially programmed block are programmed, a third Vpass_erase voltage and a third Vpass1_erase voltage when between 20% and 30% of the word lines in a partially programmed block are programmed, a fourth Vpass_erase voltage and a fourth Vpass1_erase voltage when between 30% and 40% of the word lines in a partially programmed block are programmed, a fifth Vpass_erase voltage and a fifth Vpass1_erase voltage when between 40% and 50% of the word lines in a partially programmed block are programmed, a sixth Vpass_erase voltage and a sixth Vpass1_erase voltage when between 50% and 60% of the word lines in a partially programmed block are programmed, a seventh Vpass_erase voltage and a seventh Vpass1_erase voltage when between 60% and 70% of the word lines in a partially programmed block are programmed, a eighth Vpass_erase voltage and a eighth Vpass1_erase voltage when between 70% and 80% of the word lines in a partially programmed block are programmed, a ninth Vpass_erase voltage and a ninth Vpass1_erase voltage when between 80% and 90% of the word lines in a partially programmed block are programmed, and a tenth Vpass_erase voltage and a tenth Vpass1_erase voltage when between 90% and 100% of the word lines in a partially programmed block are programmed. The controller can select the Vpass_erase voltage and a Vpass1_erase voltage from the look up table based on the amount of programmed word lines in a partially programmed block.

The method can include performing a read operation on the partially programmed block boundary word line 456 using the calculated Vpass_erase and/or Vpass1_erase voltages.

Once the read operation on the partially programmed block boundary word line is completed, the Vpass_erase and/or Vpass1_erase values can be reset to initial values, Vpass and/or Vpass1 458, respectively, for example.

Figure 5:
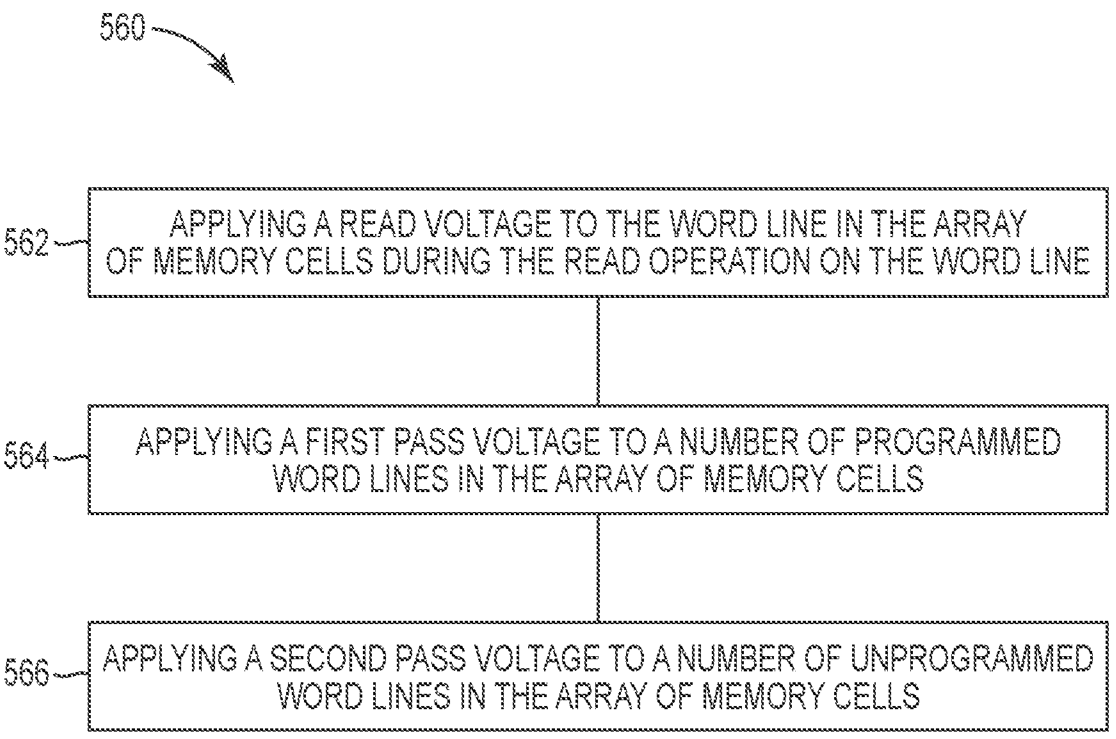
FIG. 5 is a flow diagram of a method for operating a controller configured for read operations on a partially programmed block in accordance with a number of embodiments of the present disclosure.

FIG. 5 is a flow diagram of a method 560 for operating a controller configured for read operations on a partially programmed block in accordance with a number of embodiments of the present disclosure.

At 562, the method can include applying a read voltage to the word line in the array of memory cells during the read operation on the word line. The word line that includes the memory cells that are being read can be a boundary word line in a partially programmed block, where the boundary word line is the last word line that was programmed in the block. The partially programmed block includes a portion of word lines that include memory cells that have been programmed and a portion of word lines that include memory cells that have not been programmed (e.g., are in an erased state).

A read operation can be performed on any of the programmed word lines in a partially programmed block using first, second, third, and/or pass voltages, according to embodiments of the present disclosure. For example, the boundary word line (e.g., the last programmed word line) in a partially programmed block and/or a non-boundary word line can be read. If any one of the programmed word lines 305-N to 305-T are being read, VWLRV 338 can be applied to the word line being read, such as word line 305-(T+1), for example.

At 564, the method can include applying a first pass voltage to a number of programmed word lines in the array of memory cells. When reading a boundary word line, the first pass voltage (Vpass r) can be applied to each of the number of programmed word lines, except the word line that is being read and the programmed word line adjacent to word line being read. A read voltage (VWLRV) will be applied to the word line being read and a third pass voltage (Vpass1) will be applied to the word line adjacent to the word line being read. When reading a non-boundary word line, the first pass voltage (Vpass r) can be applied to each of the number of programmed word lines, except the word line that is being read and the two programmed word line adjacent to word line being read. A read voltage (VWLRV) will be applied to the word line being read and a third pass voltage (Vpass1) will be applied to the two word lines adjacent to the word line being read.

At 566, the method can include applying a second pass voltage to a number of unprogrammed word lines in the array of memory cells. The magnitude of the second pass voltage can be less than the magnitude of the first pass voltage to reduce the voltage threshold drop in the memory cells on the boundary word line being read that can be caused by applying first pass voltage with a higher magnitude than the second pass voltage to the unprogrammed memory cells in the partially programmed block.

When reading a boundary word line, the second pass voltage (Vpass_erase) can be applied to each of the number of unprogrammed word lines, except the unprogrammed word line adjacent to word line being read. A third pass voltage (Vpass1) or a fourth pass voltage (Vpass_erase1) will be applied to the unprogrammed word line adjacent to the word line being read. When reading a non-boundary word line, the second pass voltage (Vpass_erase) can be applied to each of the number of unprogrammed word lines.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
an array of memory cells;
a controller coupled to the array of memory cells and the controller is configured to:
apply a read voltage to a word line in the array of memory cells during a read operation on the word line;
apply a first pass voltage to a number of programmed word lines in the array of memory cells during the read operation;
apply a second pass voltage to a number of unprogrammed word lines in the array of memory cells during the read operation; and
apply a third pass voltage to a programmed word line adjacent to the word line being read and a fourth pass voltage to an unprogrammed word line adjacent to the word line being read, wherein a magnitude of the third pass voltage is greater than a magnitude of the fourth pass voltage, wherein the second pass voltage is restored to an initial value after completion of the read operation.

2. The apparatus of claim 1, wherein the apparatus contains a partially programmed block comprising the number of programmed word lines and the number of unprogrammed word lines.

3. The apparatus of claim 2, wherein the word line being read is located in the partially programmed block.

4. The apparatus of claim 1, wherein a magnitude of the second pass voltage is less than a magnitude of the first pass voltage.

5. The apparatus of claim 1, further including obtaining a location of the last programmed word line in the array.

6. The apparatus of claim 1, wherein the first pass voltage and second pass voltage are based on the location of the last programmed word line in a partially programmed block.

7. The apparatus of claim 1, further including performing the read operation on a boundary word line of a partially programmed block.

8. An apparatus, comprising:
an array of memory cells;
a controller coupled to the array of memory cells and the controller is configured to:
apply a read voltage to a word line in the array of memory cells during a read operation on the word line;
apply a first pass voltage to a number of programmed word lines in the array of memory cells during the read operation;
apply a second pass voltage to a number of unprogrammed word lines in the array of memory cells during the read operation;
apply a third pass voltage to a programmed word line adjacent to the word line being read and a fourth pass voltage to an unprogrammed word line adjacent to the word line being read;
wherein a magnitude of the third pass voltage is greater than a magnitude of the fourth pass voltage, and
wherein the third pass voltage is based upon a distance between the number of unprogrammed word lines and the word line being read, and
wherein the second pass voltage is restored to an initial value after completion of the read operation.

9. The apparatus of claim 8, wherein the second pass voltage is applied to a number of unprogrammed memory cells that are not adjacent to the word line being read.

10. The apparatus of claim 8, wherein the controller is configured to use a look up table to determine a value of the second pass voltage.

11. The apparatus of claim 10, wherein the look up table includes values for the second pass voltage based upon a quantity of unprogrammed word lines comprising the number of unprogrammed word lines.

12. The apparatus of claim 8, wherein the controller is configured to calculate a value of the second pass voltage based on a location of the word line being read in a partially programmed block.

13. The apparatus of claim 8, wherein the apparatus calculates a change from the first pass voltage for the second pass voltage applied to the unprogrammed word lines based on a quantity of unprogrammed word lines in a partially programmed block.

14. A method, comprising:
performing a read operation on a word line in a memory array,
wherein performing the read operation includes:
applying a read voltage to the word line in the array of memory cells during the read operation on the word line;
applying a first pass voltage to a number of programmed word lines in the array of memory cells;
applying a second pass voltage to a number of unprogrammed word lines in the array of memory cells; and
applying a third pass voltage to a programmed word line adjacent to the word line being read and a fourth pass voltage to an unprogrammed word line adjacent to the word line being read, wherein a magnitude of the third pass voltage is greater than a magnitude of the fourth pass voltage; and
restoring the second pass voltage to an initial value after completing performing the read operation.

15. The method of claim 14, further including performing the read operation on a partially programmed block.

16. The method of claim 14, further including obtaining a location of the last programmed word line in the array.

17. The method of claim 16, further including calculating the first pass voltage and second pass voltage values based on the location of the last programmed word line and last unprogrammed word line.

18. The method of claim 14, further including performing the read operation on a boundary word line of a partially programmed block.

* * * * *